Jan. 3, 1939.  F. D. GOULD  2,142,644

VALVE CONTROLLED BOTTLE CLOSURE

Filed April 4, 1938

INVENTOR.
Frank D. Gould.
BY
Chas. E. Townsend.
ATTORNEY

Patented Jan. 3, 1939

2,142,644

UNITED STATES PATENT OFFICE 2,142,644

VALVE CONTROLLED BOTTLE CLOSURE

Frank D. Gould, Oakland, Calif., assignor of one-half to Albert M. Moore, Oakland, Calif.

Application April 4, 1938, Serial No. 199,855

5 Claims. (Cl. 215—76)

This invention relates to a valve-controlled bottle closure, which is particularly intended for use with thermos bottles and like containers.

The object of the present invention is generally to improve and simplify the construction and operation of closures of the character described; to provide a valve-controlled closure which is capable of being readily opened or closed for the purpose of dispensing the contents of the container; to provide a closure which is highly sanitary, as it consists of few parts which may be easily and quickly separated for cleaning; to provide a closure which embodies a screw cover, a stopper, and an interposed valve, said stopper and valve being secured to the screw cover and being removable with the cover as a unit when the thermos bottle is to be opened for cleaning or refilling, etc.; and further to provide a cover which is insulated with relation to the thermos bottle and its contents, so as to prevent heat escape or entry to the bottle, as the case may be.

The valve controlled bottle closure is shown by way of illustration in the accompanying drawing, in which—

Figure 1:
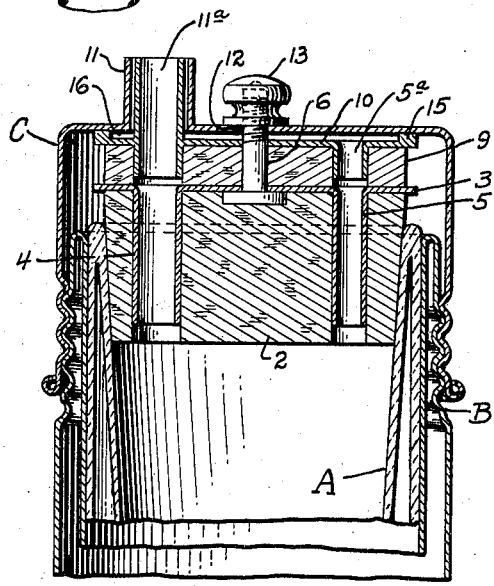
Fig. 1 is a central, vertical section of the upper end of a thermos bottle, said section also showing the valve-controlled closure.
Figure 2:
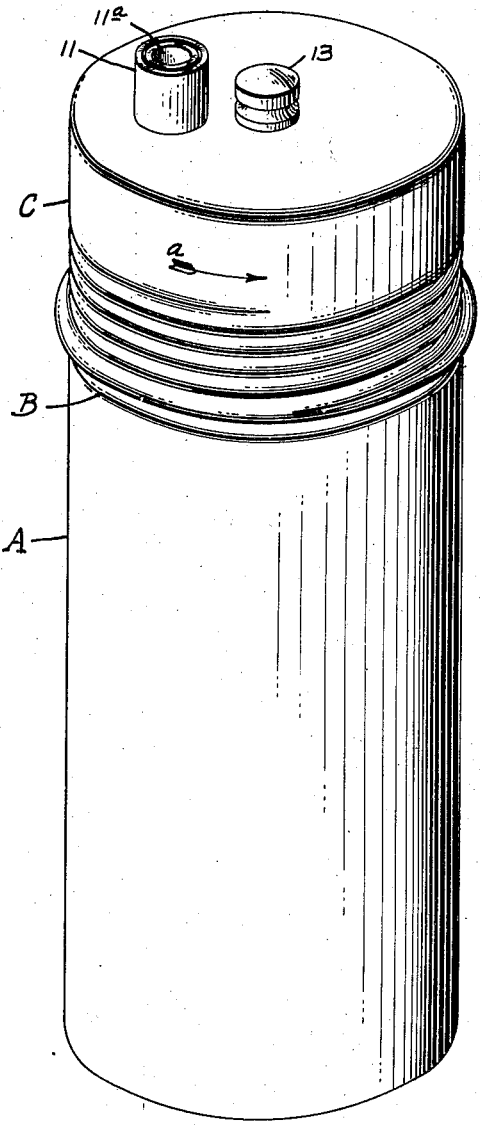
Fig. 2 is a perspective view of the thermos bottle and the valve-controlled closure.

Referring to the drawing in detail, and particularly to Figs. 1 and 2, A indicates the upper end of a thermos bottle which in this instance is closed by means of a cork or stopper 2. Secured on the upper end of the stopper is a plate 3, and projecting downwardly from said plate and into the stopper is a pouring tube 4 and a venting tube 5. These tubes serve a second function besides that of pouring and venting tubes, to wit, that of anchoring the stopper to the plate so as to rotate in unison therewith, as will hereinafter be described. Projecting upwardly from the plate is a threaded stud 6, and formed in the outer peripheral edge of the plate is a notch terminating in shoulders 7 and 8. The shoulders formed and their purpose will be hereinafter described.

Adapted to rotate about the stud 6 is a comparatively thin cork 9, and disposed on top thereof is a plate 10, from the upper surface of which projects a pouring tube 11a. This tube also projects down into the cork 9, and a similar tube 5a also projects down into the cork, and functions as a venting passage. The cork and plate 10 function as a valve, and the manner in which it is operated will hereinafter be described.

The thermos bottle is provided with the usual threaded neck B, at the upper end, to receive a standard form of screw cover C. This cover is provided with a tube 11 to receive the pouring tube 11a, and is also provided with a central opening 12 through which the stud projects, said stud being provided with a nut 13 on the outer end, so that by tightening the nut or pulling the stud upwardly against the cover C the cork or valve 9 may be held with any degree of pressure against the plate 3 and the under side of the cover. The pouring tube 11a, which projects through the tube 11, is slightly smaller in diameter than the inside diameter of the tube 11, thereby providing a venting opening; that is, the plate 10 (see Figs. 1 and 2) has an annular rim 15 formed on it, which forms a space 16 beneath the cover C, through which air may be drawn when pouring. It should also be noticed that the plate 10 has a downwardly turned lug 17 which enters into the notch or space between the shoulders 7 and 8 on the plate 3. This lug permits rotation of the plate 10 and the valve 9 with relation to the plate 3, the amount of rotation being the amount of movement of the lug 17 between the shoulders 7 and 8, and this movement is just sufficient to permit the tubes 11a and 5a to be moved into or out of register with relation to the tubes 4 and 5 in the stopper.

In actual operation, if the thermos bottle is to be filled, the cover C is unscrewed in the usual manner, and when it is removed the stopper 2 together with the valve 9 and the remaining mechanism will also be removed, as the stopper and the valve are secured to the cover by means of the screw 6 and the nut 13. The thermos bottle, thus opened, can be cleaned or filled, and when filled, the cover C is placed in position and screwed downwardly, thus forcing the stopper 2 into the open end of the bottle and closing and sealing the same. When the contents, for instance hot coffee, is to be poured out of the bottle, the cover C is turned in the direction of arrow $a$, the degree that it is turned being determined by the distance between the shoulders 7 and 8; that is, as the cover is turned in the direction of arrow $a$, lug 17 moves away from the shoulder 8 up to and into engagement with the shoulder 7, and when this is done, plate 10 and valve 9 will have rotated in unison with the screw cover, thus bringing the passages 11a and 5a into register with the passages 4 and 5 in the stopper, thereby permitting the contents of the bottle to be poured out through the spout 11a, and venting to take place at the same time, as air will enter the space formed between the tubes 11 and 11a and the space 16 and will then pass through the passages 5 and 5a into the container. When the desired amount of coffee has been dispensed, the bottle is closed by rotating the cap C in the opposite direction until the lug 17 engages the shoulder 8. In that position the passages 11a and 5a will have moved out of register with the passages 4 and 5 and these passages will accordingly be closed and sealed by the valve 9.

At first glance, it may not be apparent why the stopper 2 does not rotate in unison with the valve 9 and the screw cap C. If it did, there would obviously be no chance of rotating the valve with relation to the stopper and opening and closing of the pouring and venting openings could not take place. It should be noted that the stopper is tapered, and is forced into the open upper end of the thermos bottle when the screw cover is applied. It is gradually forced inwardly, and rotated at the same time, and as such the frictional contact increases as the stopper is forced inwardly. The area of contact between the stopper and the bottle is also considerable when compared with the area of contact between the valve 9 and the plate 3. Hence, if the cover C is rotated in the direction of arrow *a*, or in a direction to unscrew the cover, there is only a tendency to rotate the valve 9, as the friction between the stopper and the bottle is so great that it will not rotate until lug 17 engages the shoulder 7. The cover C is not rotated any farther when it is only desired to open or close the pouring and venting openings, but rotation is continued after engagement with the shoulder 7 when cover C is to be completely removed.

Figure 3:
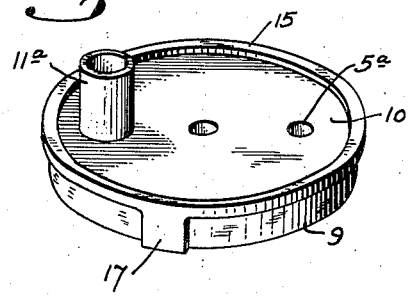
Fig. 3 is a perspective view of the valve.
Figure 4:
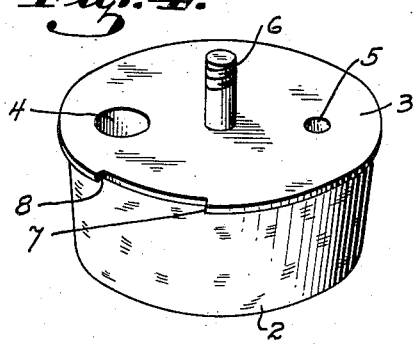
Fig. 4 is a perspective view of the stopper.

The closure as a whole is exceedingly simple and substantial in construction. It forms an effective seal when applied, as the stopper is forced into the open upper end of the bottle by screw action when the cover is being applied. The stopper is made of cork or a similar material. This is a good heat insulator, and as the metallic parts forming the closure are mounted exterior of the cork or stopper 2, any loss or entrance of heat is prevented. The tubes 4 and 5, while anchoring the cork to the plate 3, do not pass completely through the cork; hence they are not in contact with the contents of the bottle nor with any portion thereof, and heat loss through these metallic members is avoided. The device is highly sanitary, as when the cover C is removed it is possible to separate the several parts by merely unscrewing the nut 13. When this is done, the stopper and the valve 9 may be separated as shown in Figs. 3 and 4. They may thus be readily sterilized and cleaned, and so may the cover. The device is accordingly not only simple to separate and assemble but is just as easily repaired, as either the stopper or the valve 9 may be renewed from time to time if worn to any considerable extent.

While certain features of this invention have been more or less specifically described and illustrated, it is to be understood that changes may be resorted to within the scope of the appended claims, and that the materials and finish of the several parts employed may be such as the manufacturer desires, or varying conditions require.

Having thus described and illustrated my invention, what I claim and desire to secure by Letters Patent is as follows:

1. The combination with a bottle having a removable screw cover, of a stopper secured to the cover and extending into the bottle to close and seal the same, said stopper having a pouring and a venting opening formed therein, a valve interposed between the cover and the stopper, said valve having a pouring and a venting opening formed therein; and said cover having a pouring opening formed therein, and means for transmitting rotary movement from the cover to the valve to bring the pouring and venting openings formed therein into and out of register with the pouring and venting openings in the stopper.

2. The combination with a bottle having a removable screw cover, of a stopper secured to the cover and extending into the bottle to close and seal the same, said stopper having a pouring and a venting opening formed therein, a valve interposed between the cover and the stopper, said valve having a pouring and a venting opening formed therein, and a pouring spout on the valve in register with the pouring opening in the valve, said pouring spout extending through an opening in the cover, and said spout forming a connection between the valve and cover whereby rotation of the cover is transmitted to the valve to bring the pouring and venting openings formed therein into and out of register with the pouring and venting openings in the stopper.

3. The combination with a bottle having a removable screw cover, of a stopper secured to the cover and extending into the bottle to close and seal the same, said stopper having a pouring and a venting opening formed therein, a valve interposed between the cover and the stopper, said valve having a pouring and a venting opening formed therein, a pouring spout on the valve in register with the pouring opening in the valve, said pouring spout extending through an opening in the cover, and said spout forming a connection between the valve and cover whereby rotation of the cover is transmitted to the valve to bring the pouring and venting openings formed therein into and out of register with the pouring and venting openings in the stopper, and means on the valve maintaining a venting passage between the opening in the cover and the venting passage in the valve.

4. The combination with a bottle having a removable screw cover, of a stopper secured to the cover and extending into the bottle to close and seal the same, said stopper having a pouring and a venting opening formed therein, a valve interposed between the cover and the stopper, said valve having a pouring and a venting opening formed therein, and said cover having a pouring opening formed therein, means for transmitting rotary movement from the cover to the valve to bring the pouring and venting openings formed therein into and out of register with the pouring and venting openings in the stopper, and means for limiting rotary movement of the cover and valve with relation to the stopper.

5. The combination with a bottle having a removable screw cover, of a stopper secured to the cover and extending into the bottle to close and seal the same, said stopper having a pouring and a venting opening formed therein, a valve interposed between the cover and the stopper, said valve having a pouring and a venting opening formed therein, a pouring spout on the valve in register with the pouring opening in the valve, said pouring spout extending through an opening in the cover, and said spout forming a connection between the valve and cover whereby rotation of the cover is transmitted to the valve to bring the pouring and venting openings formed therein into and out of register with the pouring and venting openings in the stopper, and means for limiting rotary movement of the cover and valve with relation to the stopper.

FRANK D. GOULD.